Figure 1:
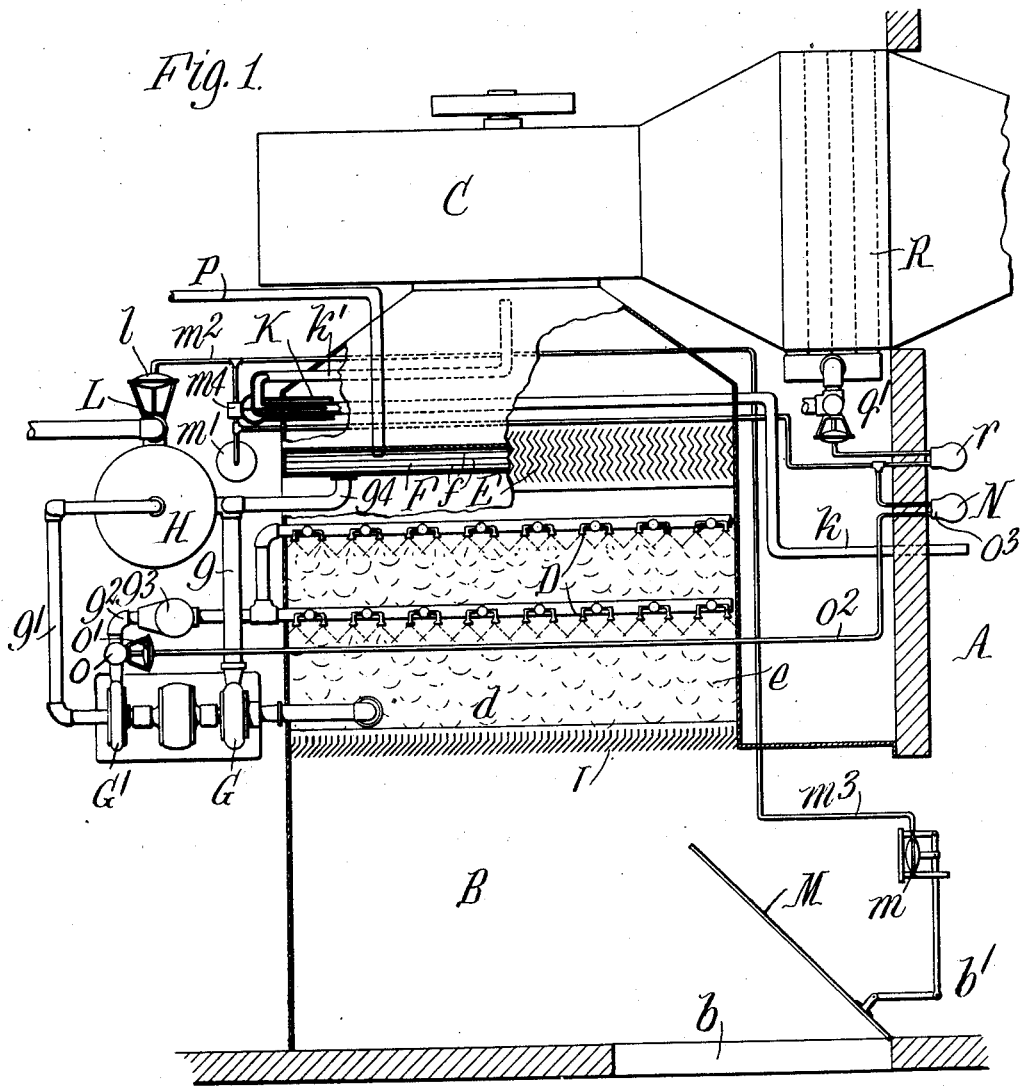

W. H. CARRIER.
SYSTEM FOR PURIFYING, HUMIDIFYING, AND CONTROLLING THE HUMIDITY OF AIR.
APPLICATION FILED APR. 23, 1908.

1,059,976.

Patented Apr. 29, 1913.

2 SHEETS—SHEET 1.

Witnesses:
E. A. Volk.
A. J. Dimond.

Inventor.
Willis H. Carrier,
By Wilhelm, Parker & Hard,
Attorneys.

W. H. CARRIER.
SYSTEM FOR PURIFYING, HUMIDIFYING, AND CONTROLLING THE HUMIDITY OF AIR.
APPLICATION FILED APR. 23, 1908.
1,059,976.
Patented Apr. 29, 1913.
2 SHEETS—SHEET 2.
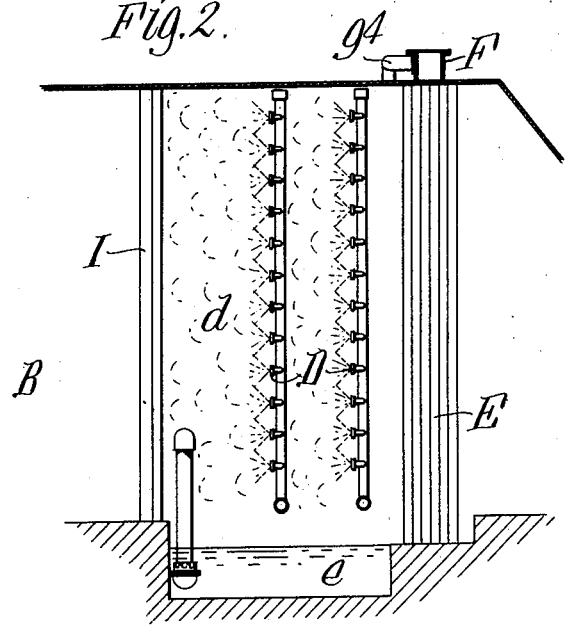
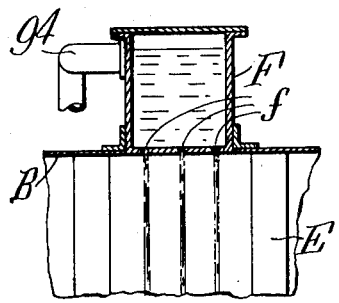
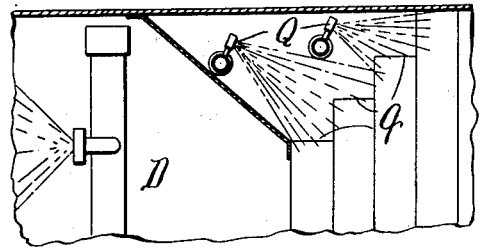
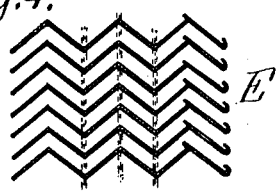
Witnesses:
E. A. Volk.
A. G. Dimond.
Inventor
Willis H. Carrier,
By Wilhelm, Parker & Hare,
Attorneys.

UNITED STATES PATENT OFFICE.

WILLIS H. CARRIER, OF BUFFALO, NEW YORK, ASSIGNOR TO BUFFALO FORGE COMPANY, OF BUFFALO, NEW YORK.

SYSTEM FOR PURIFYING, HUMIDIFYING, AND CONTROLLING THE HUMIDITY OF AIR.

1,059,976.  Specification of Letters Patent.  Patented Apr. 29, 1913.

Application filed April 23, 1908. Serial No. 428,859.

*To all whom it may concern:*

Be it known that I, WILLIS H. CARRIER, a citizen of the United States, residing at Buffalo, in the county of Erie and State of New York, have invented a new and useful Improvement in Systems for Purifying, Humidifying, and Controlling the Humidity of Air, of which the following is a specification.

This invention relates to systems and apparatus for humidifying and controlling the humidity and temperature of air, and is particularly desirable for ventilation in public buildings and in various lines of manufacture, such, for example, as silk mills and lithographing establishments, where excessive humidity is objectionable.

The primary object of the invention is to produce a system for supplying purified air to a room, building or other inclosure, and controlling the addition of moisture thereto as may be required to give a desired condition of humidity, or for washing the air without increasing its humidity when the external air already has a great degree of humidity and this is necessary to prevent excessive humidity in the room or building.

This invention is in the nature of an improvement in the system of humidifying and controlling the humidity and temperature of air disclosed in my application for U. S. patent filed May 17, 1907, Serial No. 374,215, in which a differential thermostat is employed which is influenced by the air in the room or building to be controlled and the saturated air supplied thereto from the humidifier for automatically maintaining a definite relation between the temperature of the dew point of the saturated air and the temperature of the air in the room or building, whereby a desired relative humidity of the air in a room or building is preserved notwithstanding fluctuations of the temperature thereof. In this improved system means are provided for supplying water for humidifying the air and separate means for washing the air without at all or materially increasing its humidity. The temperature of the air entering the humidifier is automatically regulated so as to govern the humidity of the air leaving the humidifier, as in the previous case, either by mixing external air and air returned from the room or building in varying proportions according to external atmospheric conditions, or by changing the temperature of the water used for humidifying the air, or by these actions conjointly, or in any other suitable way, and in addition automatic means are provided which shut off the humidifying devices when the humidity of the external atmosphere is so high that the addition of moisture would produce an excessive or undesirable humidity in the room or building, and the entering air will then only be washed or cleansed without adding appreciably to its humidity.

In the accompanying drawings, consisting of two sheets; Figure 1 is a diagrammatic plan view, partly in section, of an air purifying and humidifying and humidity controlling apparatus embodying the invention. Fig. 2 is a longitudinal sectional elevation of the humidifier. Fig. 3 is a fragmentary sectional elevation, on an enlarged scale, of the air washing and drying device. Fig. 4 is a horizontal section of a few of the eliminator baffles or plates. Fig. 5 is a fragmentary sectional elevation of an air washing device of slightly modified construction.

Like letters of reference refer to like parts in the several figures.

A represents a room, building or other inclosure (hereinafter termed a room) which is to be supplied with purified air, the humidity and temperature of which is to be controlled; B an air trunk or casing having admission openings or passages $b$ $b'$, respectively for external air and return air from the room, and C a fan or device for drawing the air through the trunk and discharging it into the room.

D represents humidifying devices for saturating the air in the humidifying chamber $d$ of the air trunk with water, and E an air washer and drier for eliminating the free water from the air together with the solid impurities which are gathered and held by the water.

The humidifying devices, as in said application, preferably consist of numerous spray nozzles of the cyclone type which produce a very fine conical spray or mist, but they are preferably arranged to direct the spray in opposition to the current of air through the humidifier, that is, they discharge toward the air inlet to the humidifying chamber $d$. By this arrangement the impact of the water with the air is increased, and the air tends to flatten out or spread the conelike sprays of water so that a very intimate contact of all portions of the air with the water and the thorough saturation or humidification of the air is secured.

The eliminator E is preferably the same as in said application and consists of a series of zig-zag plates arranged vertically and spaced apart so as to form numerous sinuous or zig-zag passage-ways between them for the air. The saturated air impinges against the oblique faces of the eliminator plates and the free water in the air collects on the plates and flows down them in thin films into a collecting well or basin $e$ in the bottom of the humidifying chamber, and the impurities of the air are caught by the films of water and removed from the air. The eliminator thus dries the air or relieves it of free moisture and also cleanses or washes it.

In addition to the spray nozzles D for saturating the air, water is also supplied directly onto the eliminator plates to insure a more thorough and uniform flushing thereof and consequently a more thorough washing of the air. For this purpose a flushing tank F is preferably arranged over the eliminator plates and is provided with transverse continuous slots $f$ in its bottom through which the water flows from the tank in sheets between the eliminator plates. These sheets of water, except for the air currents, would form thin walls of water across the spaces between the eliminator plates, but the air currents blow or deflect the sheets of water over against those oblique faces of the eliminator plates which are immediately in rear of the sheets of water so that such faces of the plates have solid films of water flowing down the same, and these films catch and remove the solid impurities from the air impinging against them, and insure a very thorough cleansing or washing of the air. The water carried by the air from the spray nozzles sufficiently wets the first one or two oblique faces of the eliminator plates, but the spray water alone does not so thoroughly wet the succeeding oblique faces of the plates, and without the water from the flushing tank such succeeding faces of the plates are apt to become fouled by the impurities from the air. Excellent results are secured by providing the flushing tank with three slots arranged to discharge the sheets of water so as to wet three intermediate oblique faces of the plates, but this particular number and arrangement of the slots is not absolutely essential.

G represents a low pressure centrifugal pump which takes the water from the well or basin $e$ in the bottom of the humidifier and supplies it by a pipe $g$ to a water heater H, and G' represents a high pressure centrifugal pump which takes the water from the heater by a pipe $g'$ and supplies it by a pipe $g^2$ to the spray nozzles D. The same water is thus circulated, being taken from the collecting basin of the humidifier and returned to the spray nozzles after passing through the heater.

$g^3$ represents a strainer for removing the solid impurities from the water. Water is supplied to the flushing tank F from the low pressure pump G by a pipe $g^4$, and this water is not heated.

The flushing tank with the slots extending transversely over the eliminator plates is a very desirable construction, because it produces uniform films of water on the surfaces of the plates, and an irregularity in the arrangement of the plates will not affect its action, whereas great exactness would be required in the arrangement of the plates if separate discharge openings for the plates were provided, and the cost of the slotted tank is much less.

I represents a baffle device which is located at the entrance of the humidifying chamber $d$ of the air trunk and preferably consists of spaced upright bent or angular baffle plates which are arranged parallel with each other and relatively close together and offer sufficient resistance to the passage of air to distribute it throughout the cross area of the humidifying chamber. This device also serves to catch and prevent the escape of any large particles of water from the humidifying chamber which may be projected from the spray nozzles with sufficient impetus to otherwise escape from the humidifying chamber. Any suitable device adapted to produce these results could be employed in place of the spaced baffle plates shown.

The air humidifying and drying means constructed as described have proven eminently efficient in practice and are therefore preferred, but the regulating means about to be described are not restricted to use with any particular humidifying and drying devices and any suitable means can be employed for these purposes.

K represents the differential thermostat for regulating the temperature of the saturated air leaving the humidifier. As shown, the thermostat projects into the discharge end of the humidifying chamber and one of its elements is influenced by the saturated air therein, while its other element is influenced by air from the room A which is circulated past the thermostat by pipes $k$ $k'$ connecting the thermostat with the room and with the intake of the fan C. The location of the thermostat is not important so long as its elements are influenced by the air of the room A and the saturated air of the humidifier.

The thermostat preferably controls the temperature of the saturated air leaving the humidifier, by regulating a valve L in the steam supply pipe to the water heater to govern the temperature of the spray water, and by regulating the mixture of external air and return air from the room admitted to the humidifying chamber, for instance, by means of a damper M adapted to open and close the external and return air inlet passages $b$ $b'$. The steam valve and damper can be actuated by diaphragms or motors $l$ and $m$ of well known construction operated by compressed air supplied thereto from a reservoir $m'$, or other source, through suitable pipes $m^2$ $m^3$ which are controlled by a valve $m^4$ actuated by the thermostat. The thermostat by the differential action of its elements will, through the described instrumentalities, adjust the steam valve L of the water heater to raise or lower the temperature of the spray water and shift the damper M to alter the proportions of the external air and the return air from the room, depending upon the relative difference in temperature of the saturated air in the humidifier and the air in the room A, and thus maintain a predetermined necessary relation between these temperatures. The thermostat may be of any suitable construction and may regulate the temperature of saturated air admitted to the room by the means described, or by any other suitable instrumentalities. A thermostat adapted for this purpose is disclosed in U. S. Letters Patent No. 902,713, granted to me November 3, 1908.

The differential thermostat K can thus regulate the temperature of the saturated air in the humidifier and produce a desired condition of humidity in the room A under normal external atmospheric conditions. If, however, the humidity of the external atmosphere is such as to give the desired humidity of the air in the room without the addition of further moisture, it becomes necessary to shut off the spray water so as not to further increase the humidity of the air and give the air in the room or building an excessive or undesirable degree of humidity. To do this a humidistat N is located in the room A and controls a valve O in the supply pipe for the spray nozzles through the instrumentality of a suitable diaphragm or motor O' operated by compressed air supplied to it by a pipe O² controlled by a valve O³ actuated by the humidistat. A humidistat suitable for the purpose is disclosed in U. S. Letters Patent No. 896,690, granted to me August 18, 1908. This humidistat is adjusted so that it will not operate to close the valve O until the humidity in the room or building is excessive or greater than that which can be controlled by the differential thermostat K. This humidistat therefore does not conflict with or affect in any way the operation of the differential thermostat. When the spray water is cut off by the action of the humidistat N the low pressure pump will continue the supply of water to the flushing tank F for the eliminator, and the sheets of water flowing from the flushing tank and wetting the eliminator plates will cleanse the air of solid impurities, but will not add materially to the moisture contents of the air, because the air impinging against the solid films of water on the eliminator plates does not produce such an intimate contact with the water as is necessary to increase its humidity. Thus the air will be purified but its humidity will not be materially increased. As the heat transference between the water and air in the eliminator is slight when the sprays are shut off, it is possible to maintain the temperature of the water used for flushing the eliminator plates at or slightly below the dew point of the incoming air by adding thereto a comparatively small amount of cold water, in which case the air is washed without the addition of any moisture whatever. A supply pipe P for cold water for this purpose is shown in Fig. 1.

The flushing tank F constructed and arranged as described is very efficient for the purpose stated, but other means could be employed for flushing the eliminator plates. For example, in Fig. 5 a different construction is shown in which a second set of spray nozzles Q is located near the upper front portion of the eliminator plates in such manner that the spray from the same is directed onto some of the oblique faces of the eliminator plates. The upper front corners of the eliminator plates are cut off at $q$, as shown in said Fig. 5, so that the spray from the nozzles Q will strike and form downwardly flowing films of water on the intermediate oblique faces of the plates.

A steam radiator R is shown in the air trunk for heating the air delivered to the room, and this heater is automatically regulated to produce a desired temperature in the room by an ordinary thermostat $r$ located in the room and controlling the steam valve $q'$ of the radiator, for instance, by air-operated means such as employed for regulating the spray water heater H. This heater for the air can be used or not, as desired.

I claim as my invention:

1. The combination of means for supplying air to an inclosure, means for supplying water to the air for humidifying it, an eliminator for removing water from the air, means for supplying water separately to said eliminator, means for controlling the temperature of the humidified air, and automatic means governed by the humidity in the inclosure for shutting off the water to said humidifying means, substantially as set forth.

2. The combination of means for supplying air to an inclosure, means for supplying water to the air for humidifying it, automatic means for regulating the temperature of the humidified air supplied to the inclosure relative to the temperature existing in the inclosure, a humidistat influenced by the humidity of the air in the inclosure, and means controlled by said humidistat for decreasing the supply of water to said humidifying means, substantially as set forth.

3. The combination of means for supplying air to an inclosure, means for supplying water to the air for humidifying it, automatic means for maintaining a definite relation between the temperature of the humidified air and the temperature of the air in the inclosure, a humidistat influenced by the humidity of the air in the inclosure, and means controlled by said humidistat for shutting off the water to the humidifying means when a predetermined degree of humidity in the air of the inclosure is exceeded, substantially as set forth.

4. The combination of means for supplying air to an inclosure, means for supplying water to the air for humidifying it, means for eliminating water from the air, means for supplying water separately to said eliminating means, automatic means for maintaining a definite relation between the temperature of the humidified air and the temperature of the air in the inclosure, and automatic means governed by the humidity of the air in the inclosure for shutting off the water to said humidifying means when a predetermined degree of humidity in the air of the inclosure is exceeded, substantially as set forth.

5. The combination of means for supplying air to an inclosure, means for supplying water to the air for humidifying it, eliminator plates for removing water and impurities from the air, means independent of said humidifying means for flushing said eliminator plates, means for controlling the temperature of the humidified air, and automatic means governed by the humidity of the air in the inclosure for shutting off the water to said humidifying means, substantially as set forth.

6. The combination of means for supplying air to an inclosure, means for humidifying the air to be supplied to the inclosure, automatic means for maintaining a predetermined relation between the temperature of the humidified air and the temperature of the air in the inclosure, a humidistat influenced by the humidity of the air in the inclosure, and means controlled by said humidistat for decreasing the humidifying action of the humidifying means when the humidity of the air in the inclosure is excessive, substantially as set forth.

7. The combination of means for supplying air to an inclosure, means for humidifying the air to be supplied to the inclosure, means for separately supplying water for washing the air, automatic means for regulating the temperature of the humidified air, and automatic means governed by the humidity of the air in the inclosure for stopping the humidifying action of the humidifying means when the humidity of the air in the inclosure is excessive, substantially as set forth.

8. The combination of means for supplying air to an inclosure, automatic means for maintaining substantially a predetermined relation between the dew point temperature of said air and the temperature in said inclosure so as to maintain substantially a predetermined relative humidity in the inclosure regardless of fluctuations in the temperature therein, spaced eliminator plates between which said air flows for removing the free moisture and impurities from the air, and flushing means constructed to discharge water in sheets flowing downwardly crosswise in the spaces between said eliminator plates for washing the air, substantially as set forth.

9. The combination of a humidifying chamber, means for causing air to flow through the same, spray nozzles arranged in said chamber to direct their sprays in opposition to the air current, and air baffles at the air entrance to the humidifying chamber and in front of said nozzles for distributing the air in said chamber and preventing the escape of the spray from the chamber, substantially as set forth.

Witness my hand, this 6th day of April, 1908.

WILLIS H. CARRIER.

Witnesses:
C. W. PARKER,
C. B. HORNBECK.